United States Patent
Warshavsky et al.

(10) Patent No.: US 10,380,094 B2
(45) Date of Patent: Aug. 13, 2019

(54) CUSTOM MULTI-TENANT NON-RELATIONAL PLATFORM OBJECTS

(71) Applicant: salesforce.com, inc., San Francisco, CA (US)

(72) Inventors: Alex Warshavsky, Walnut Creek, CA (US); Adam Torman, Walnut Creek, CA (US); Eli Levine, San Francisco, CA (US); Jan Asita Fernando, San Francisco, CA (US); Samarpan Jain, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 207 days.

(21) Appl. No.: 15/283,130

(22) Filed: Sep. 30, 2016

(65) Prior Publication Data

US 2018/0096013 A1    Apr. 5, 2018

(51) Int. Cl.
*G06F 17/30*    (2006.01)
*G06F 16/22*    (2019.01)

(52) U.S. Cl.
CPC ........ *G06F 16/2291* (2019.01); *G06F 16/221* (2019.01); *G06F 16/2282* (2019.01)

(58) Field of Classification Search
CPC .............. G06F 17/30; G06F 17/30342; G06F 17/30315; G06F 16/2291; G06F 16/221; G06F 16/2281
USPC ......................................................... 707/755
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

International Search Report and Written Opinion dated Dec. 13, 2017 issued in PCT Application No. PCT/US2017/054090.

(Continued)

*Primary Examiner* — Isaac M Woo
(74) *Attorney, Agent, or Firm* — Weaver Austin Villeneuve & Sampson LLP

(57) ABSTRACT

Disclosed are examples of systems, apparatus, methods and computer program products for creating custom platform objects for a multi-tenant non-relational database environment. A database system maintains a multi-tenant non-relational database associated with multiple enterprises and a number of records for each of the enterprises. The system also maintains a dynamic virtual table associated with a number of records. A request is received from one of the enterprises to define a custom data object within the database system, uniquely associated with an enterprise. The request is processed, and a custom object is generated based on the request. The custom object defines database columns corresponding to the data object and the enterprise. The virtual table is updated to include virtual columns corresponding to the database column definitions, and existing columns of a shared table in the non-relational database are updated to match the virtual columns. Access to the existing columns is then restricted for enterprises not uniquely associated with the custom data object.

20 Claims, 11 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,313,572 B2 | 12/2007 | Lin |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,620,888 B2 | 12/2013 | Basu et al. |
| 8,646,103 B2 | 2/2014 | Jakobson et al. |
| 8,973,106 B2 | 3/2015 | Torman et al. |
| 9,628,493 B2 | 4/2017 | Warshavsky et al. |
| 9,710,127 B2 | 7/2017 | Torman et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |

(56) References Cited

U.S. PATENT DOCUMENTS

| | | |
|---|---|---|
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0138566 A1 | 6/2005 | Muller et al. |
| 2005/0223022 A1 | 10/2005 | Weissman et al. |
| 2005/0227678 A1 | 10/2005 | Agrawal et al. |
| 2005/0283478 A1 | 12/2005 | Choi et al. |
| 2008/0249972 A1 | 10/2008 | Dillon |
| 2009/0006427 A1 | 1/2009 | Veeraraghavan et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0262674 A1 | 10/2010 | Tanaka et al. |
| 2011/0218958 A1 | 9/2011 | Warshavsky et al. |
| 2011/0238709 A1 | 9/2011 | Liu et al. |
| 2011/0247051 A1 | 10/2011 | Bulumulla et al. |
| 2012/0042218 A1 | 2/2012 | Cinarkaya et al. |
| 2012/0191735 A1 | 7/2012 | Duff et al. |
| 2012/0233137 A1 | 9/2012 | Jakobson et al. |
| 2012/0290407 A1 | 11/2012 | Hubbard et al. |
| 2013/0103802 A1 | 4/2013 | Kawata |
| 2013/0173669 A1 | 7/2013 | Tang et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0006441 A1 | 1/2014 | Torman et al. |
| 2014/0013400 A1 | 1/2014 | Warshavsky et al. |
| 2014/0359537 A1 | 12/2014 | Jakobson et al. |
| 2014/0380051 A1* | 12/2014 | Branish, II .......... G06F 21/6227 713/169 |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0106736 A1 | 4/2015 | Torman et al. |
| 2015/0127670 A1 | 5/2015 | Torman et al. |
| 2015/0142596 A1 | 5/2015 | Jakobson et al. |
| 2015/0142783 A1 | 5/2015 | Bruce et al. |
| 2015/0172563 A1 | 6/2015 | Jakobson et al. |
| 2016/0041976 A1 | 2/2016 | Pradeep et al. |
| 2016/0065541 A1 | 3/2016 | Winner et al. |
| 2016/0105409 A1 | 4/2016 | Warshavsky et al. |
| 2017/0075922 A1 | 3/2017 | Torman et al. |
| 2017/0076012 A1 | 3/2017 | Sreenivasa et al. |
| 2018/0025113 A1 | 1/2018 | Torman et al. |
| 2018/0096012 A1 | 4/2018 | Warshavsky et al. |
| 2018/0096165 A1 | 4/2018 | Warshavsky et al. |

OTHER PUBLICATIONS

U.S. Appl. No. 15/283,119, filed Sep. 30, 2016, Warshavsky et al.
U.S. Appl. No. 15/283,145, filed Sep. 30, 2016, Warshavsky et al.
"Google Plus Users", Google+Ripples, Oct. 31, 2011 [retrieved on Feb. 21, 2012 from Internet at http://www.googleplusers.com/google-ripples.html], 3 pages.
U.S. Appl. No. 15/097,090, filed Apr. 12, 2016, Torman et al.
U.S. Appl. No. 15/097,102, filed Apr. 12, 2016, Sreenivasa et al.
U.S. Appl. No. 15/218,468, filed Jul. 25, 2016, Torman et al.
U.S. Office Action dated Apr. 18, 2018 issued in U.S. Appl. No. 15/283,145.
U.S. Final Office Action dated Apr. 22, 2019 issued in U.S. Appl. No. 15/283,119.
International Preliminary Report on Patentability dated Apr. 11, 2019 issued in PCT Application No. PCT/US2017/054090.

* cited by examiner

Static Schema

LOGIN EVENT

| TENANT_ID | CHAR(15) |
|---|---|
| CREATED_DATE | DATE |
| CREATED_BY | CHAR(15) |
| EVENT_DATE | DATE |
| LOGIN_TYPE | CHAR(1) |
| USERNAME | CHAR(40) |
| LOGIN_STATUS | CHAR(2) |

310

Physical layout in HBase

| TENANT_ID | CREATED_DATE | CREATED_BY | EVENT_DATE | LOGIN_TYPE | USERNAME | LOGIN_STATUS |
|---|---|---|---|---|---|---|
| TENANT_ID | CREATED_DATE | CREATED_BY | EVENT_DATE | LOGIN_TYPE | USERNAME | LOGIN_STATUS |

LOGIN_EVENT View

Defined on top of PLATFORM_OBJECT_BASE

— 510

| EVENT_DATE | DATE |
|---|---|
| LOGIN_TYPE | CHAR(1) |
| USERNAME | CHAR(40) |
| LOGIN_STATUS | CHAR(2) |

FIELD_CHANGE_EVENT View

— 520

| EVENT_DATE | DATE |
|---|---|
| OLD_VALUE | VARCHAR |
| NEW_VALUE | VARCHAR |
| PARENT_OBJECT_ID | CHAR(15) |

LOGIN_EVENT view for Customer Acme Corp

Defined on top of LOGIN_EVENT view for specific customer

— 530

| ACME_SYSTEM_ID | CHAR(2) |
|---|---|
| CORRELATION_ID | CHAR(200) |

LOGIN_EVENT view for Customer Enterprise Inc

Defined on top of LOGIN_EVENT view for specific customer

— 540

| ENTERPRISE_OBJECT_ID | CHAR(20) |
|---|---|

FIGURE 5

Physical layout in HBase

| TENANT_ID="ACME" | OBJECT_TYPE="LGN" | CREATED_DATE | CREATED_BY | EVENT_DATE | LOGIN_TYPE | USERNAME | LOGIN_STATUS | ACME_SYSTEM_ID | CORRELATION_ID |
|---|---|---|---|---|---|---|---|---|---|
| TENANT_ID | OBJECT_TYPE="FLC" | CREATED_DATE | CREATED_BY | EVENT_DATE | OLD_VALUE | NEW_VALUE | PARENT_OBJECT_ID | | |
| TENANT_ID="ENTERPRISE" | OBJECT_TYPE="LGN" | CREATED_DATE | CREATED_BY | EVENT_DATE | LOGIN_TYPE | USERNAME | LOGIN_STATUS | ENTERPRISE_OBJECT_ID | |

CUSTOM MULTI-TENANT NON-RELATIONAL PLATFORM OBJECTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to non-relational database systems, and more specifically to creating custom platform objects for a multi-tenant non-relational database environment.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products for creating custom platform objects for a multi-tenant non-relational database environment. These drawings in no way limit any changes in form and detail that may be made by one skilled in the art without departing from the spirit and scope of the disclosed implementations.

FIG. 3 shows an example of a data object being added to a physical table of a non-relational database, prior to the use of the methods described in this application.

FIG. 5 shows an example of several data object definitions to be stored in a dynamic non-relational shared table, in accordance with some implementations.

FIG. 6 shows an example of a physical layout of a shared table in a non-relational database, in accordance with some implementations.

DETAILED DESCRIPTION

Figure 1:
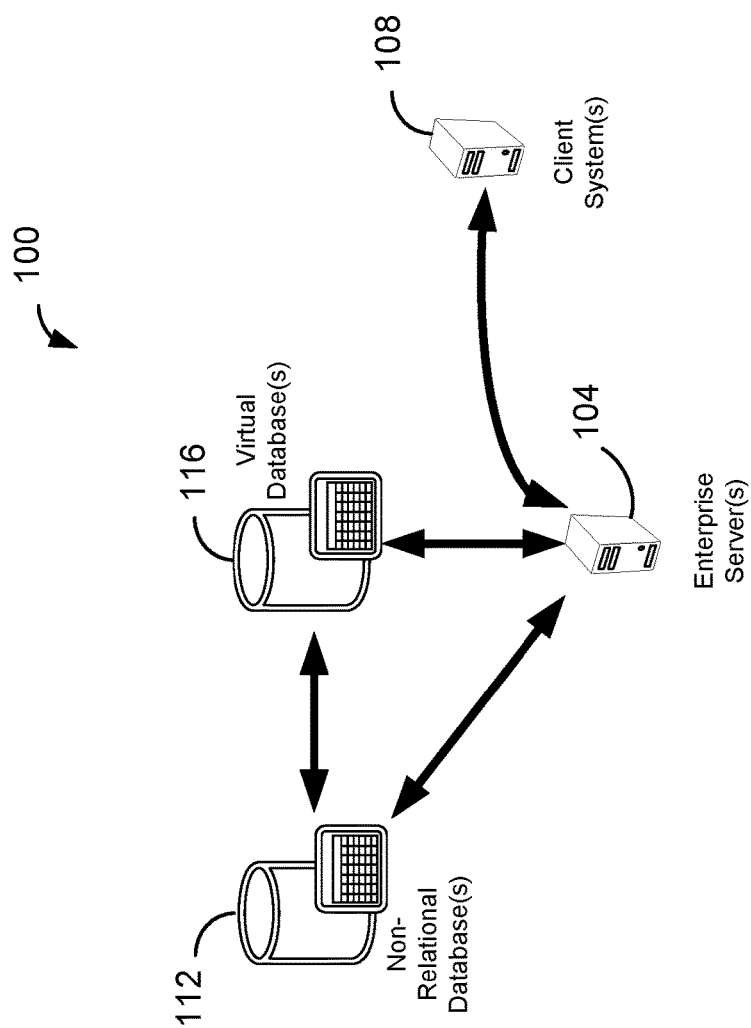
FIG. 1 shows a system diagram of an example of a system 100 for updating and managing multi-tenant non-relational database schemas, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for creating custom platform objects for a multi-tenant non-relational database environment.

In some multi-tenant database systems, a multi-tenant architecture is used wherein customer organizations (i.e., tenants) share database resources in one logical database. The database tables themselves are typically shared; each entity in the data model typically contains an organization_id or tenant_id column that distinguishes rows for each tenant. Queries and data manipulation in the context of a tenant are filtered through this tenant_id column, which is often indexed, to ensure proper security and the appearance of private databases. In the salesforce.com system, for example, this strategy is used to expose standard objects such as Account, Contact, Lead, and Opportunity to customers.

Traditionally, standard objects were used within shared tables in a relational database, such as Oracle. In such a table, a standard object may be shared among tens of thousands of customers per instance. When a table had to be fundamentally changed, such as adding a new field corresponding to a new object, or removing a field, it would present considerable problems. The relational database schema would have to be altered, including defining a new table, indexes, and more, at the physical level of the database. The database owner would not be free to make changes anytime; rather, the database would have to be locked down and altered only at certain times, resulting in a very expensive operation.

More recently, advances have been made to remove this downtime. In this method, rather than defining a new physical table when you must add a field containing a new object, a row is added to a metadata table. The row indicates that a virtual table is storing the data in another table dynamically. At the physical database level, rows are merely being inserted, which is a low-cost and non-intrusive operation, requiring no downtime. An existing column is then updated in an existing table to add the new data. Thus, adding a field is part of application logic, rather than part of relational database schema changes.

While this was very useful and cost-effective for a relational multi-tenant database, non-relational database systems have become very popular in recent years. Non-relational database systems are ideal for applications that need fast access to large amounts of data. They provide flexible, scalable database schemas for large datasets. One such non-relational database is HBase. Non-relational databases can lead to fast, real-time capturing of large amounts of data in logs. Rather than the strict structure of a traditional relational database, a non-relational database can provide for unstructured databases. HBase is capable of providing column databases, which store and process data using a pointer that points to many columns that are distributed over a cluster. Because a non-relational database like HBase is designed differently from relational databases, however, a framework has been lacking to handle objects and schema management in the same efficient, low-cost way as relational databases.

By way of illustration, Acme is a company that runs a multi-tenant database system where thousands of organizations capture large datasets in real-time. Acme maintains an HBase database for this data capture and storing. It has decided to drop a column of its HBase shared database, "Login_Status", relating to an object "Login_Event", because it wishes to change the login status into a different format. Acme discovers it cannot simply update the database schema, however, because it would involve suspending operation of the table and updating the database schema, which would interrupt massive amounts of real-time data collection. Acme also has several changes it would like to make in provisioning different objects and database fields to specific customers with access privileges, on a customer-by-customer basis. There is no way to do this, however, without major interruptions and updates to the schema. Finally, Acme would like to allow its organizations to make their own objects and fields for individual organizational needs, but this would be difficult for the same reasons.

Some of the disclosed techniques can be implemented to provide for dynamically updating schema elements in a multi-tenant database system via a script at the application layer, rather than having to physically change the database structure. Instead of defining a new physical table, a base platform object ("BPO"), also known as a data object, is defined in a scripting language, such as XML. A BPO is a database object, such as a standard object like Accounts or Leads, that can be quickly added to a database for the needs of one or more organizations. A dynamic virtual database is maintained, including a virtual table with a shared schema, at the application level. The BPO scripted definition is used to represent the BPO in columns of the virtual table. One or more rows are then added to a physical non-relational table, representing the new BPO. Since a non-relational database such as HBase allows for column databases in which multiple configurations of varying columns can be present for different rows, this does not violate the properties of a physical non-relational column table. Thus, a new object is defined and represented within the database, and multiple organizations can create records utilizing that object. This can be performed with zero downtime or interruption to the database storage and processing.

Some of the disclosed techniques can be implemented to allow organizations to create custom base platform objects ("custom BPOs") within a multi-tenant non-relational database system. A standard non-relational database schema, containing a number of standard objects provisioned to all organizations within the database system, can be extended with organization-defined custom BPOS with custom attributes. A tenant of the database defines an object in a script such as XML, or extends an existing object from a shared schema. This custom object and its attributes are converted to be included in a dynamic virtual table. A physical non-relational table is then updated with columns corresponding to the custom object and its attributes. The custom object is restricted to use only for the records within the database associated with the tenant who created them; this restriction is performed based on the tenant's unique identification, or tenant_id, associated with the tenant's records.

Some of the disclosed techniques can be implemented to provide for dynamically provisioning access rights to a subset of a shared table to one or more tenants within a multi-tenant non-relational database system, via access controls. A standard schema is shared across all tenants of the shared table, using non-relational BPOs. The schema is configurable such that segments can be provisioned to specific tenants at the application layer, giving them access and permission rights to different sets of BPOs very quickly within the system. One organization can have access to certain columns of the shared schema for its data requirements, while another organization can have access to other columns.

Applying some implementations of the disclosed techniques, an alternative scenario to that described above is provided. In this alternative scenario, Acme has once again decided to remove a column from its HBase non-relational shared database, relating to the object "Login_Event". Instead of being forced to define a new physical table, leading to unacceptable interruption of the data collection and storage occurring in the database, a different setup allows for better schema management. In this setup, a base platform object ("BPO") for Login_Event is defined by Acme in an XML script. A dynamic virtual database is maintained by Acme, including a virtual table with a shared schema. The BPO scripted definition of Login_Event is automatically converted via an application into a database object definition, or "view", that can be read by HBase. This view is used to represent Login_Event in one or more columns of the virtual table, including a "Login_Status" column. When it comes time to remove the "Login_Status" column, a script is written to shift the columns in the virtual database at the application layer. If a first column disappears, then the script instructs the virtual database to copy all columns from the second column down. At the database layer of HBase, rather than there being explicitly defined data types for each column, like there would be in a relational database, instead there are simply bytes, and any column may be redefined at the application layer. Thus, removing a column can occur by shifting columns down, and there is no need to create a whole new table. If Acme wishes to add a Login_Status column with a different data type, it can easily do so by defining a new BPO with the changed Login_Status, converting it to be used in the virtual table, and then copying the columns of the virtual table into the HBase table. Again, no downtime or creation of a new table is necessary.

In addition, any of the tenants of Acme's database can create their own custom BPOs for their own needs, and have unique, sole access to those BPOs within the shared database. This can be accomplished by allowing a script to extend the function of a standard_object. For example, if a customer of Acme wanted a special Login_Event object with a different Login_Status format, then that customer would be able to write an XML script defining that object, and that script can be converted to enter the object into the virtual table. Since all columns can be given access or restricted in the table on a tenant-by-tenant basis, the virtual table can be configurable such that only this customer has the columns pertaining to its own custom BPO. The object can be moved to the HBase table as well in the form of columns accessible only for that customer, based on the unique tenant_id of the customer that is tied to its records and custom BPOs.

Another benefit to Acme is that these techniques allow for Acme to quickly provision access rights to various customers for different BPOs. For example, Acme wants to create a free tier and a premium tier for its customers, with access to different objects in the shared table for each. With the BPOs and custom BPOs in place in the HBase table, all tied to tenant_IDs for customers, it is simple to change the database scheme at the application layer, via a virtual table, to declare and define different rules pertaining to an object. Acme can easily decide that some objects should be defined to only have access at the premium tier, while other objects should be defined to have access at both the free and premium tiers. This can be defined in an XML script, converted to the virtual table, then moved to the HBase physical table to allow for different columns for free tier customers and premium tier customers.

In some but not all implementations, the disclosed methods, apparatus, systems, and computer-readable storage media may be configured or designed for use in a multi-tenant database environment or system.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for updating and managing multi-tenant non-relational database schemas, in accordance with some implementations. System 100 includes a variety of different hardware and/or software components which are in communication with each other. In the non-limiting example of FIG. 1, system 100 includes at least one enterprise server 104, at least one client system 108, at least one non-relational database 112, and at least one virtual database 116.

Non-relational database 112 can allow for storage and retrieval of large sets of data. The non-relational database 112 can be a database implemented in HBase or other non-relational database management system. This database can include one or more records for each of a plurality of enterprises (also referred to as organizations, or tenants.) In some implementations, the database can include one or more shared tables, in which multiple enterprises have records in the same table, and share many of the same standard objects and columns for their records. In some implementations, each enterprise is associated with a tenant_id that provides unique identification for that particular enterprise in the non-relational database 112. For example, the entity Acme may have a tenant_id of "123" which uniquely identifies Acme as associated with a record or object. No other tenant within a shared table may have the same tenant_id.

In some implementations, the non-relational database 112 has one or more shared tables which take the form of a distributed, linearly scalable, consistent key-value store. In a key-value store, data within a row is grouped by one or more columns. Columns impact the physical arrangement of data stored in the database. Columns are defined based on one or more objects within the database system. Rows need not all contain the same columns. Each row can represent one record within the shared table, and rows can be sorted and queried through a row key which uniquely identifies that row. One example of a row key is a tenant_id which uniquely identifies a tenant of the shared table.

In some implementations, the non-relational database 112 may work in conjunction with one or more applications that provide the non-relational database 112 with the functionality of a relational database. For example, it may provide the appearance of a relational database, structured schema, data types, and SQL querying. One example of such an application is Phoenix, which may work in conjunction with HBase and one or more drivers to provide relational features to HBase non-relational databases.

Virtual database 116 is a database that exists at an application level in system 100. In some implementations, the virtual database 116 may be running within or in conjunction with one or more software applications. The virtual database 116 differs from the non-relational database 112 in that data is not stored in a physical or low-level database. Instead, data can be stored virtually in the application layer or in a local or remote storage, through semi-structured sources and other ways outside of the typical relational or non-relational database storage methods. Since the virtual database 116 does not store data at the low level of traditional databases, it is not as limited in terms of schema management and modification. The structure of a virtual database may be quickly changed at the application layer.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the non-relational database 112 or the virtual database 116. It may combine some or all of the data from different databases, and send the processed data to client system 108.

Client system 108 may be a computing device capable of communicating via one or more data networks with a server.

Examples of client system 108 include a desktop computer or portable electronic device such as a smartphone, a tablet, a laptop, a wearable device such as Google Glass®, another optical head-mounted display (OHMD) device, a smart watch, etc. Client system 108 includes at least one browser in which applications may be deployed.

Figure 2:
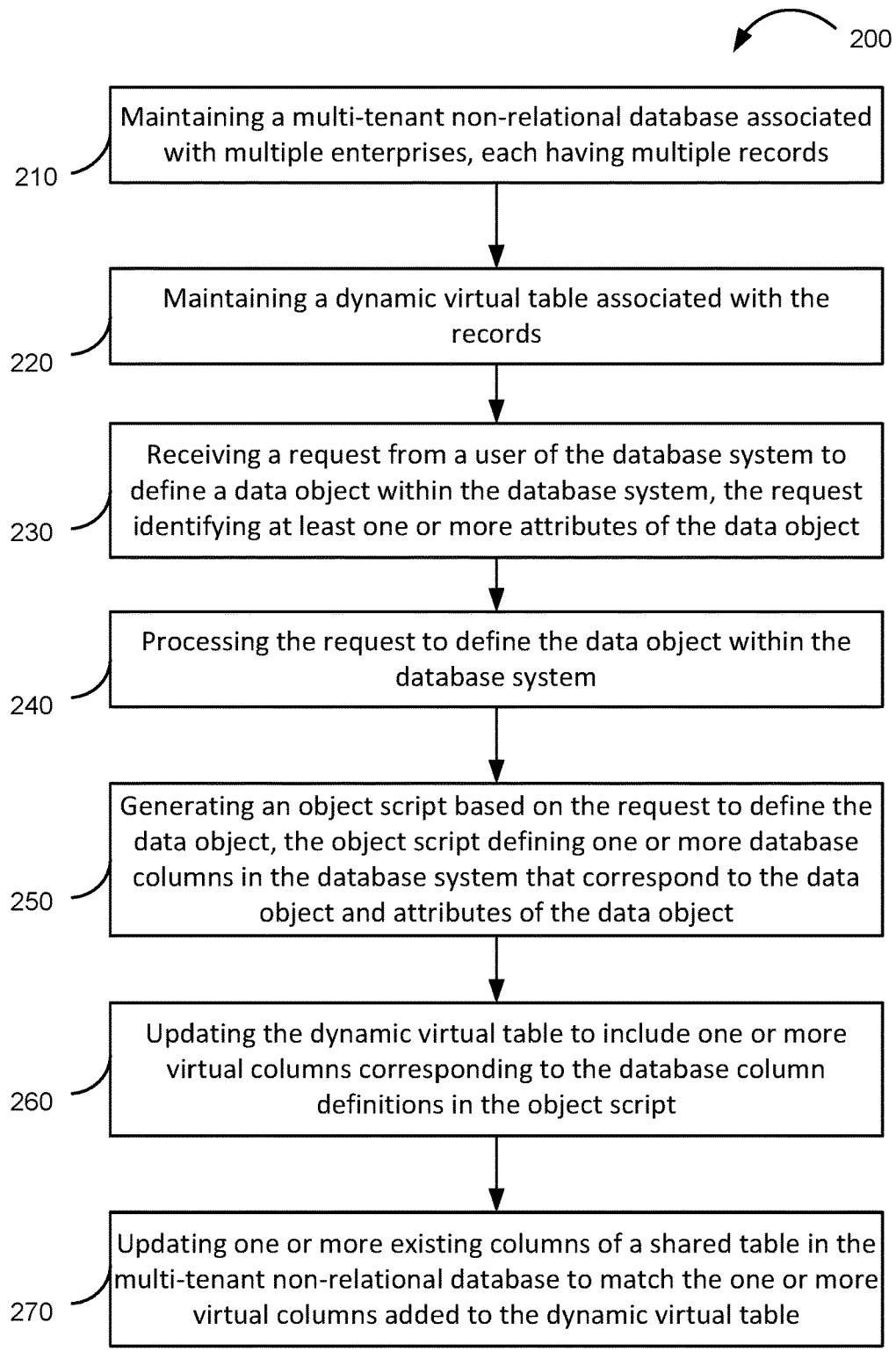
FIG. 2 shows a flowchart of an example of a method 200 for updating and managing database schemas in a multi-tenant non-relational database system, performed in accordance with some implementations

FIG. 2 shows a flowchart of an example of a method 200 for updating and managing database schemas in a multi-tenant non-relational database system, performed in accordance with some implementations. Method 200 and other methods described herein may be implemented using system 100 of FIG. 1, although the implementations of such methods are not limited to system 100.

At block 210, system 100 maintains a multi-tenant non-relational database 112 associated with multiple enterprises, each having multiple records. In some implementations, the multiple enterprises are each users of the system 100 and may be able to store and process data in the form of records. The records may be part of a shared table of the non-relational database 112. In some implementations, each record takes the form of a row of the shared table, with a number of columns representing objects. In some implementations, the number, type, and size of columns may vary depending on the enterprise associated with the record and the data objects of that enterprise. In the case of standard objects, columns denoting attributes of the standard object may appear for all enterprises, or a designated permission set of enterprises of the shared table. For example, a standard object "User_Profile" may be designated to be accessed by all enterprises of the shared table, with attributes Username, User_Age, and User_Location associated with the User_Profile object. Each of these attributes have columns in the shared table that appear for every record of every enterprise. In some implementations, custom objects may be designated for a limited set of enterprises. For example, if Acme has an Acme_User custom object made specifically for its purposes, then only Acme's records may include the Acme_User object and associated columns in its records. Thus, some enterprises may have access to different columns in the table than other enterprises, and some records (and therefore rows) may include different columns than other records.

In some implementations, each tenant or enterprise of the multi-tenant non-relational database 112 is associated with an enterprise identification (enterprise ID) that uniquely identifies the enterprise. In some implementations, the enterprise identification may be a unique number or string of alphanumeric characters. In some implementations, each row (and record) of the shared table in the non-relational database 112 has a column for the enterprise ID, which may be named, for example, "tenant_id", "enterprise_id" or "org_id". This enterprise ID column may be designated as a row key for the table. The records of the shared table may then be sorted by the enterprise_id row key, and may be queried based on the enterprise_id. In this way, each record is easily sorted, searched, and retrieved based on the enterprise associated with that record.

At block 220, the system maintains a dynamic virtual table associated with the records of the multi-tenant non-relational database 112. The dynamic virtual table may be part of the virtual database 116 of system 100. In some implementations, the dynamic virtual table is part of an application in the system 100, or functions in conjunction with an application. In some implementations, a subset of all of the records stored in the multi-tenant relational database 112 may be stored in the dynamic virtual table. In some implementations, an enterprise ID as described above may also be designated as a row key for each of the virtual table's records for sorting and querying.

At block 230, the system receives a request from a user of the non-relational database 112 to define a data object within the database. The request identifies at least one or more attributes of the data object. In some implementations, the request from the user comes from the client system 108. In some implementations, the request comes from the enterprise server 104. A user may be an enterprise or representative member of an enterprise, the developer or maintainer of the system 100, the developer or maintainer of the multi-tenant non-relational database 112, or some other user. In some implementations, the request takes the form of one or more documents in a declarative language. For example, the request may be an XML or JSON file. In the case of an XML file, the file may include several script instructions or declarative definitions pertaining to the data object. For example, lines may involve such statements as, "entity name=Login_Event", "field name=Event_Date", "field type=DATETIME", and so on. This example is a request from a user to define the data object, Login_Event, as well as an attribute of the Login_Event with the name Event_Date in a date/time format. In some implementations, an object type can also be identified within the request. An object type is an indicator of the specific type of the object being referred to within the system 100. Examples of object types may be accounts, leads, opportunities, event logs, or chat feeds. In some implementations, the attributes of the data object may be custom attributes created or defined by an enterprise or user of system 100. In some implementations, the request identifies one or more primary keys associated with the data object. The one or more primary keys may be attributes or columns for the data object. By designating one or more primary keys, records may be sorted and queries based on the primary key column or primary key columns identified. In some implementations, at least one of the primary keys designated is the enterprise ID attribute for the data object. For example, an org_id field may be a primary key for a shared table, and records in the table may be sorted based on that org_id field. Thus, records for ACME would be sorted such that they appear prior to records for ENTERPRISE.

At block 240, the system processes the request to define the data object within the database system. In some implementations, the enterprise server 104 or other element of system 100 receives and interprets the request. In some implementations, the user who sends the request is inspected for security and authenticated before the request can be interpreted or acted upon. In some implementations, the system opens one or more applications that are capable of reading and responding to or performing the request, such as an application capable of processing an XML file.

At block 250, the system generates an object script based on the request to define the data object. The object script defines one or more database columns in the database system that correspond to the request's data object and attributes of the data object. In some implementations, the object script may take the form of a data object definition, or "view", capable of being read by one or more applications of the system 100. In some implementations, the object script is automatically generated based on the request from the user. For example, upon receiving the user request in the form of an XML file defining a data object, the system 100 processes the request, then automatically converts the XML data object definitions into an object script. In some implementations, the object script defines the data object and the one or more attributes of the data object as database structures in a data description language associated with the multi-tenant non-relational database. For example, the non-relational database 112 may work in conjunction with an application such as Phoenix that allows SQL statements to be read and performed on the non-relational database 112. An application may be accordingly configured to convert the data object request into a series of SQL statements that define the object in SQL terms readable by the non-relational database. For example, an object script may contain SQL or SQL-like statements such as, "WHEN Object_Type='Login', Column1=Source_IP CHAR(32), Column2=Event_Date DATE FROM Base_Platform_Object". In this example, the non-relational database 112, virtual database 118, or applications associated with system 100 may be configured to understand these statements and add columns to one or more tables of the non-relational database 112 and virtual database 118 according to the statements. In some implementations, the object script may be compatible for processing by the virtual database 116 in addition to, or in place of, the non-relational database 112.

At block 260, the system updates the dynamic virtual table to include one or more virtual columns corresponding to the database column definitions in the object script. Since the dynamic virtual table of virtual database 118 operates in the application layer rather than the database layer, it does not have the strict requirements and limitations of updating a physical database schema. Instead, the dynamic virtual table may add one or more columns, delete one or more columns, or otherwise modify the virtual database schema without restrictions.

At block 270, the system updates one or more existing columns of a shared table in the multi-tenant non-relational database 112 to match the one or more virtual columns added to the dynamic virtual table. In some implementations, one or more columns are modified, added to or removed from a physical non-relational table, representing the new data object and its attributes. In some implementations, data may be written to the shared table regarding the one or more existing columns being updated. In some implementations, updating the columns includes one or more operations to be performed in a non-relational database, such as a Put operation, a Delete operation, a CheckAndPut operation, a CheckandDelete operation, an Increment operation, a Get operation, and a Scan operation. Since a non-relational database such as HBase allows for a key-value store in which multiple configurations of varying columns can be present for different rows, updating the database in this manner does not violate the properties of the physical non-relational table. At the database layer, rather than there being explicitly defined data types for each column, like there would be in a relational database, instead there are bytes, and any column may be redefined at the application layer. Thus, in some implementations, removing a column can occur by shifting columns down, and there is no need to create a whole new table. In some implementations, adding a new column can be performed by copying the columns of the virtual table into the non-relational table.

In some implementations, the system adds one or more records to the shared table in the multi-tenant non-relational database. In some implementations, the addition of one or more records may be caused by an enterprise storing data that has been captured in one or more events. The added records are associated with the one or more existing columns or data objects of the shared table. For example, an Object_ID field in a record may determine which data object corresponds to the record.

FIG. 3, FIG. 4, FIG. 5, and FIG. 6 illustrate an example of a data object being created prior to base platform object methods, then an example of data objects being created with the base platform object methods in a non-relational database.

FIG. 3 shows an example of a data object being added to a physical table of a non-relational database, prior to the use of the methods described in this application. A data object 310 named "LOGIN EVENT" is shown in a tabular format. It includes several attributes: TENANT_ID, CREATED_DATE, and more. Each of the attributes correspond to a data type or data format for the attribute, such as CHAR(15) representing a 15-character string in CHAR type. A shared non-relational table 320 in HBase contains the data object 310. Each column of the shared table 320 corresponds to one of the attributes of the data object 310. Each row will have data entered that will relate to the column attributes of the data object. For example, a row may have a TENANT_ID of "123", a CREATED_DATE of "11/15/2014", and so on, representing a login of a user.

If a column of FIG. 3 needs to be renamed, modified, or removed, the underlying HBase table has to change. The shared table 320 represents a physical layout of a table in the database, and changes to a physical table cannot be made without causing usage downtime of the table. For example, a maintainer of the table may decide to change the data type of LOGIN_TYPE from CHAR(1) to CHAR(4). In order to do this, the table must be taken down and login events cannot be recorded until the update has been performed. This is a shortcoming of the non-dynamic method of designing tables without the BPO methods of this application.

Figure 4:
FIG. 4 shows an example of a dynamic schema for a non-relational shared table, in accordance with some implementations.

FIG. 4 shows an example of a dynamic schema for a non-relational shared table, performed in accordance with some implementations. BPO table 410 is a multi-tenant, shared, dynamic, non-relational table in HBase. In some implementations, the BPO table 410 includes one or more of: a TENANT_ID attribute for uniquely identifying the tenant or enterprise; an OBJECT_TYPE attribute for identifying the particular data object of which an instance is being stored in the table; a CREATED_DATE attribute for identifying when the instance of the data object was created; and a CREATED_BY attribute for identifying the creator of the data object instance. In some implementations, the OBJECT_TYPE attribute identifies a code designated the specific object within the system 100 that is being referred to. For example, if a Login Event object has an OBJECT_TYPE of "LGN", then when a record appears in the BPO table 410 with an OBJECT_TYPE of "LGN", it is ascertainable that the record pertains to a Login Event.

FIG. 5 shows an example of several data object definitions to be stored in a dynamic non-relational shared table, performed in accordance with some implementations. The data object definitions may be codified in object scripts, or "views", containing instructions for building the data object columns in a non-relational database. Login Event object 510 is a BPO defined on top of the BPO table 410, meaning that the BPO table 410 defined in FIG. 4 will be extended with the columns related to attributes of the Login Event object 510, if the object type for a Login Event is designated. In some implementations, one or more applications, such as Phoenix, are configured to determine which object is associated with a particular object type, and then to determine which virtual table and "view" is defined on top of the base table 410 to extend the columns. The record is then added to a row of the non-relational shared table, which enters in all of the associated data for the object's attributes in bytes for each of the corresponding columns. Field Change Event object 520 is also a BPO defined on top of the BPO table 410.

Login Event custom BPO 530 is an example of a custom BPO. Specifically, custom BPO 530 is a custom base platform object defined on top of a Login Event object 510 for a specific customer or enterprise using the non-relational database. This means that in addition to a Login Event 510 object being defined on top of the base table 410, the columns are further extended to include the Login Event custom BPO 530 attributes if the designated customer is identified by the data in the record. In some implementations, a unique enterprise ID may identify the customer for purposes of a custom BPO object. In this example, the custom BPO 530 pertains to the customer Acme Corp. One or more attributes specific to the customer may be defined. In some implementations, one or more Correlation attributes may be defined which are configurable to aggregate data associated with one or more columns of the shared table. For example, a customer may be collecting all logins that their users are performing. A Correlation_ID attribute may be used to correlate all of the logins of the customers and store them as a custom field. Other customers will not see this field; it will only be visible to this particular customer. When logins are being stored, the customer will be able to view this special column which can match up multiple customers with a particular login event or time. Login Event custom BPO 540 is a similar custom BPO defined on top of a Login Event object 510, specifically for the customer Enterprise Inc.

FIG. 6 shows an example of a physical layout of a shared table in a non-relational database, performed in accordance with some implementations. This is a physical table that may result from the dynamic base table 410 and data object definitions of FIG. 5. First, the columns associated with the base table 410 are added and data is read in. The first row 610 has a TENANT_ID designating Acme Corp as the enterprise associated with this record, and an OBJECT_TYPE designating "LGN", which refers to a Login Event object 510. It also has CREATED_DATE and CREATED_BY columns of the base table 410. One or more applications, such as Phoenix, process the object type "LGN" and determine that a Login Event object 510 should extend the columns for this record. In addition, the one or more applications process the TENANT_ID "ACME" and determine that a custom BPO 530 should further extend the columns, specific for the customer Acme Corp. The applications update a virtual table with all of the data for this record, including columns pertaining to the Login Event attributes and custom Login Event attributes pertaining to Acme Corp. The applications then use the virtual table to update columns of the shared table of the multi-tenant non-relational database, to match the virtual column data added to the virtual table. The physical layout of row 610 is thus updated with the data of the virtual table with all ten columns included, in byte form. Rather than update the physical schema of this database, existing columns are modified to include data in bytes. This allows for storing objects with varying attributes and data for multiple tenants, in one single shared table. In some implementations, the storage process described above occurs in real time or substantially real time. In some implementations, data can be queried in accordance with one or more applications which are configured to determine the data objects for records stored using this physical layout, then retrieve and process them.

Figure 7:
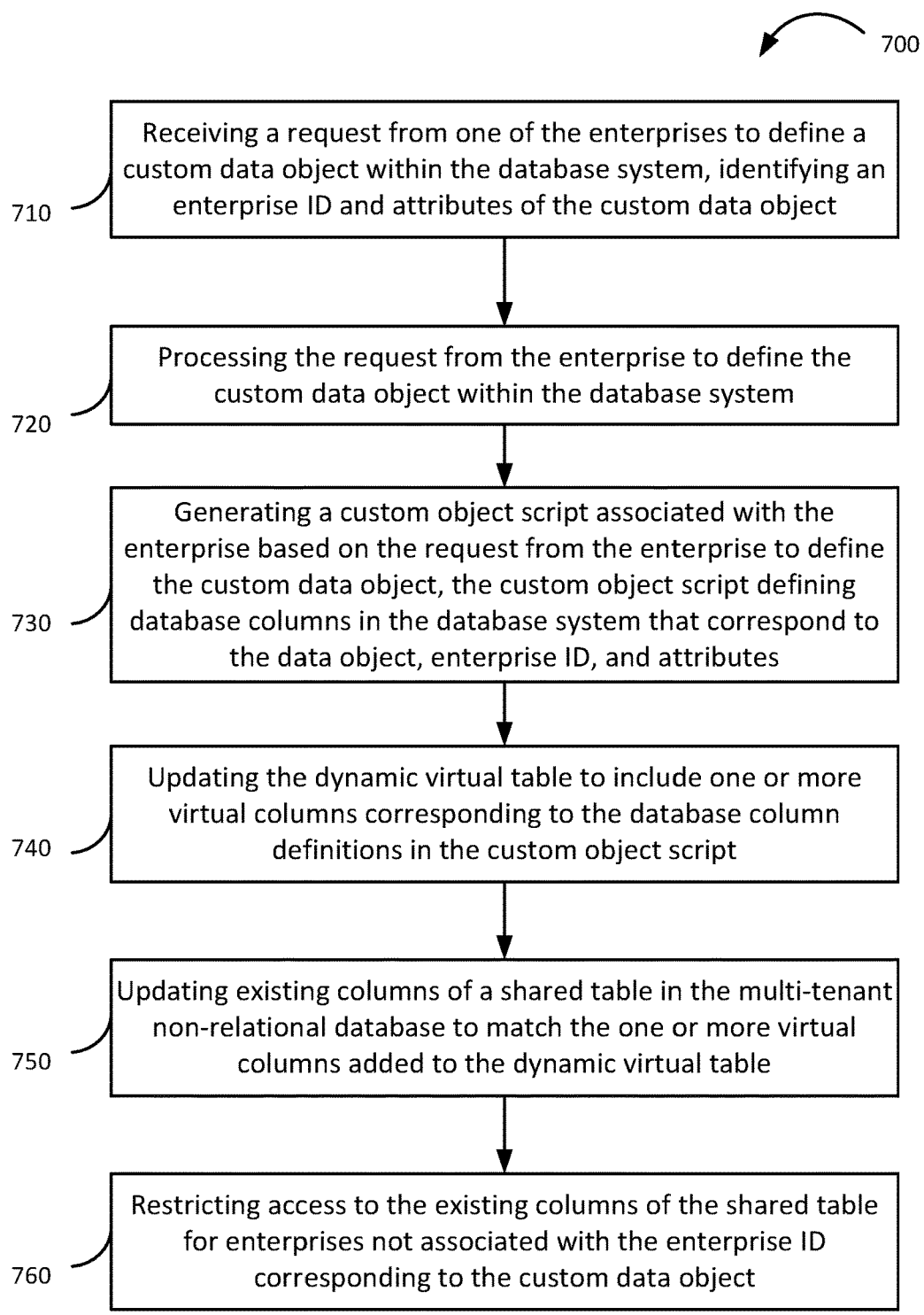
FIG. 7 shows a flowchart of an example of a method 700 for creating custom base platform objects for a multi-tenant non-relational database system, performed in accordance with some implementations.

FIG. 7 shows a flowchart of an example of a method 700 for creating custom base platform objects for a multi-tenant non-relational database system, performed in accordance with some implementations. Initially, the steps 210 and 220 from FIG. 2 are performed, to maintain a multi-tenant non-relational database associated with multiple enterprises, each with multiple records; and to maintain a dynamic virtual table associated with the records.

At block 710, the system receives a request from one of the enterprises to define a custom data object within the database system, identifying an enterprise ID and attributes of the custom data object. In some implementations the request may also include an object type attribute. The request identifies at least one or more attributes of the custom data object. In some implementations, the request from the user comes from the client system 108. In some implementations, the request comes from the enterprise server 104. A user may be an enterprise or representative member of an enterprise, the developer or maintainer of the system 100, the developer or maintainer of the multi-tenant non-relational database 112, or some other user. In some implementations, the request takes the form of one or more documents in a declarative language. In some implementations, the request or documents may be created by the enterprise associated with the enterprise ID. In some implementations, the request may be an XML or JSON file. In the case of an XML file, the file may include several script instructions or declarative definitions pertaining to the data object. In some implementations, the request may specify that the custom data object should be an extension on top of an existing data object. For example, a custom Login Event object may be specified and defined on top of a standard Login Event object, adding additional attributes that may be of interest to a specific enterprise. In some implementations, the request identifies one or more primary keys associated with the custom data object. The one or more primary keys may be attributes or columns for the custom data object. By designating one or more primary keys, records may be sorted and queries based on the primary key column or columns identified. In some implementations, one of the primary keys designated is the enterprise ID attribute for the data object. For example, an org_id field may be one of the primary keys for a shared table, and records in the table may be sorted based on that org_id field. Thus, records for ACME would be sorted such that they appear prior to records for ENTERPRISE.

At block 720, the system processes the request from the enterprise to define the custom data object within the database system. In some implementations, the enterprise server 104 or other element of system 100 receives and interprets the request. In some implementations, the enterprise sending the request, or designated in the enterprise ID, is inspected for security and authenticated before the request can be interpreted or acted upon. In some implementations, the system opens one or more applications that are capable of reading and responding to or performing the request, such as an application capable of processing an XML file.

At block 730, the system generates a custom object script associated with the enterprise, based on the request to define the custom data object. The custom object script defines one or more database columns in the database system that correspond to the request's custom data object and attributes of the custom data object. In some implementations, the custom object script specifies that it is an extension of one or more standard data objects. In some implementations, the custom object script may take the form of a custom data object definition, or custom "view", capable of being read by one or more applications of the system 100. In some implementations, the custom object script is automatically generated based on the request from the user. For example, upon receiving the user request in the form of an XML file defining a custom data object, the system 100 processes the request, then automatically converts the XML custom data object definitions into a custom object script. In some implementations, the custom object script defines the custom data object and the one or more attributes of the custom data object as database structures in a data description language associated with the multi-tenant non-relational database. In some implementations, the object script may be compatible for processing by the virtual database 116 in addition to, or in place of, the non-relational database 112.

At block 740, the system updates the dynamic virtual table to include one or more virtual columns corresponding to the database column definitions in the custom object script. Since the dynamic virtual table of virtual database 118 operates in the application layer rather than the database layer, it does not have the strict requirements and limitations of updating a physical database schema. Instead, the dynamic virtual table may add one or more columns, delete one or more columns, or otherwise modify the virtual database schema without restrictions.

At block 750, the system updates one or more existing columns of a shared table in the multi-tenant non-relational database 112 to match the one or more virtual columns added to the dynamic virtual table. In some implementations, one or more columns are modified, added to or removed from a physical non-relational table, representing the new custom data object and its attributes. Since a non-relational database such as HBase allows for a key-value store in which multiple configurations of varying columns can be present for different rows, this does not violate the properties of the physical non-relational table. At the database layer, rather than there being explicitly defined data types for each column, like there would be in a relational database, instead there are bytes, and any column may be redefined at the application layer. Thus, in some implementations, removing a column can occur by shifting columns down, and there is no need to create a whole new table. In some implementations, adding a new column can be performed by copying the columns of the virtual table into the non-relational table.

At block 760, the system restricts access to the existing columns of the shared table for enterprises not associated with the enterprise ID corresponding to the custom data object. In some implementations, one or more applications may modify the permissions and access rights of one or more enterprises with respect to one or more custom data objects, or one or more attributes of custom data objects, or one or more columns of the shared table pertaining to the data objects. In some implementations, restricting access constitutes providing access only to the enterprise associated with the enterprise ID, and not providing access to any other enterprise. In some implementations, restricting access constitutes affirmatively restricting access to enterprises in the multi-tenant non-relational database not associated with the enterprise ID.

In some implementations, the system associates the updated one or more existing columns of the shared table, or one or more rows or records pertaining to the custom data object, with one or more privacy settings. In some implementations, the privacy settings determine the visibility of the one or more existing columns to one or more enterprises. In some implementations, more granular privacy settings may give an enterprise control access to allow other enterprises or specific users to view one or more data objects, columns, or rows associated with the enterprise.

Figure 8:
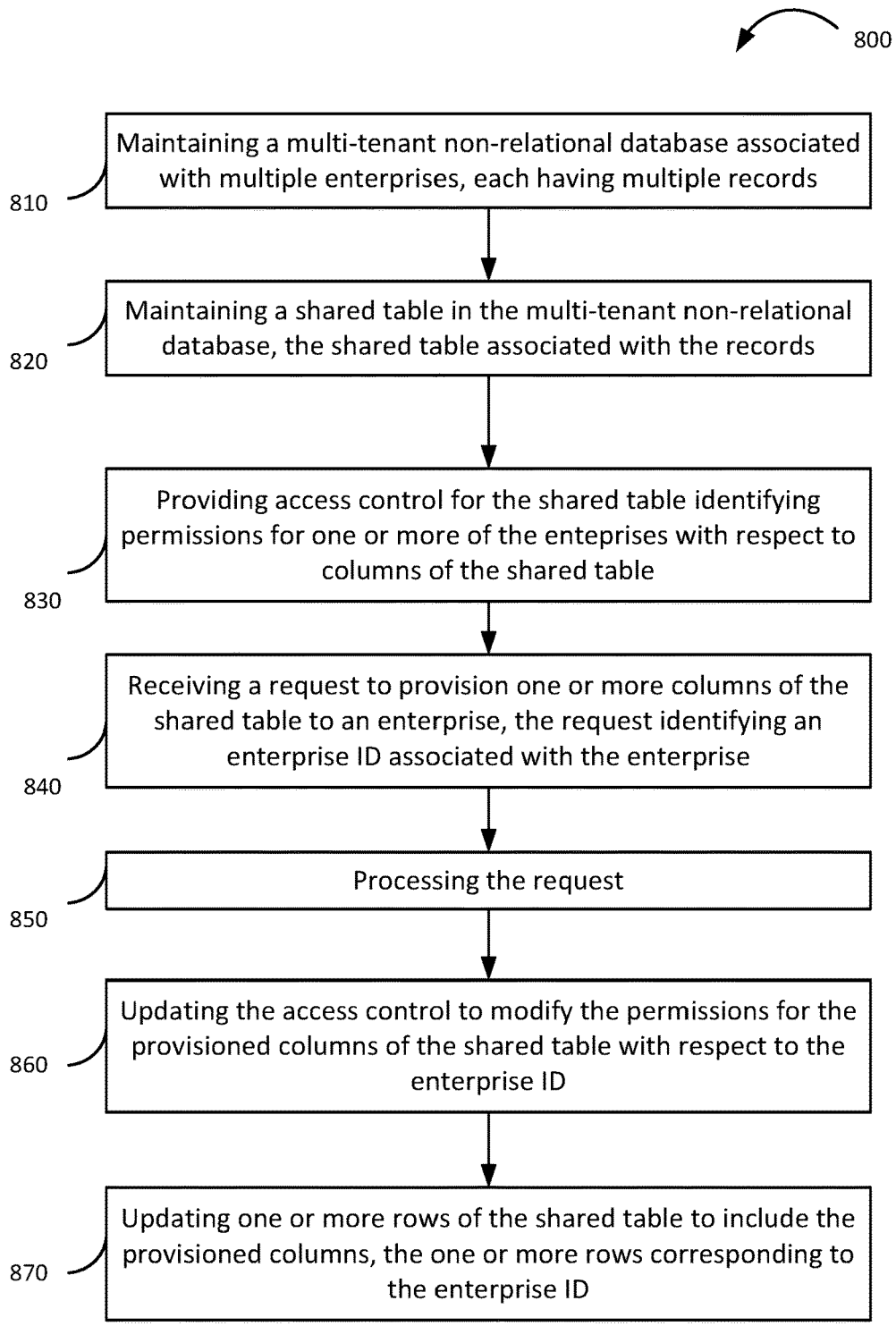
FIG. 8 shows a flowchart of an example of a method 800 for dynamically provisioning a subset of a shared table or schema via access controls, performed in accordance with some implementations.

FIG. 8 shows a flowchart of an example of a method 800 for dynamically provisioning a subset of a shared table or schema via access controls, performed in accordance with some implementations.

At block 810, the system maintains a multi-tenant non-relational database associated with multiple enterprises, each having multiple records. This step is identical to step 210 of FIG. 2.

At block 820, the system maintains a shared table in the multi-tenant non-relational database, the shared table associated with the records. In some implementations, this shared table includes one or more records with varying standard data objects and custom data objects associated with the records. Different numbers of columns may be present for different records, in accordance with the techniques described herein.

At block 830, the system provides access control for the shared table identifying permissions for one or more of the enterprises with respect to columns of the shared table. In some implementations, a permissions list is stored in the system 100. The permissions list is associated with the shared table of the non-relational database, and lists the permissions for data objects or columns with respect to enterprises of the database. In some implementations, the system can retrieve the permissions list to determine the current permissions for an enterprise, or the current permissions for a data object. In some implementations, a user interface is provided at the enterprise server 104 or client system 108. The user interface may display the current access controls and permissions for one or more enterprises, with respect to one or more columns or data objects of the shared table. The user interface may also include interactive elements associated with permissions for the shared table, which allow the user to quickly designate granular access control with a minimum amount of effort. In some implementations, the user interface may provide an administrative console to define permissions to users at a granular level. In some implementations, the administrative console may provide one or more maintainers of the shared table to give access to certain standard or custom data objects to specific enterprises. In some implementations, providing access control may involve affirmatively restricting access to one or more data objects. In some implementations, access control may be provided for one or more columns in the shared table.

At block 840, the system receives a request to provision one or more columns of the shared table to an enterprise, the request identifying an enterprise ID associated with the enterprise. In some implementations, the one or more columns may correspond to one or more standard data objects or custom data objects. In some implementations, the request may come from an owner or maintainer of the shared table, or from a user or enterprise with special privileged rights or moderation abilities. In some implementations, the system additionally receives a request to associate permissions metadata for one or more columns of the shared table. The permissions metadata is configurable to define one or more rules for provisioning access to the one or more columns. Thus, several steps to provision access can be performed using permissions metadata. In some implementations, permissions metadata may be defined in one or more databases of the system. In some implementations, permissions metadata may be defined in as a subset of application metadata 66 in tenant data storage 22, as illustrated in FIG. 9B.

At block 850, the system processes the request to provision the one or more columns of the shared table to an enterprise. In some implementations, the enterprise server 104 or other element of system 100 receives and interprets the request. In some implementations, the owner, maintainer, or enterprise sending the request is inspected for security and authenticated before the request can be interpreted or acted upon. In some implementations, the system opens one or more applications that are capable of reading and responding to or performing the request, such as a provisioning application. In some implementations, the system provisions the one or more columns to an enterprise via access control, thus enabling visibility, storage, retrieval and other abilities for the enterprise.

At block 860, the system updates the access control to modify the permissions for the provisioned columns of the shared table with respect to the enterprise ID. In some implementations, a provisioning application modifies the permissions of the shared table of the multi-tenant non-relational database. In some implementations, the permissions of multiple enterprises can be modified simultaneously in a bulk operation. In some implementations, the permissions related to multiple data objects can be modified simultaneously in a bulk operation.

At block 870, the system updates one or more rows of the shared table to include the provisioned columns, the one or more rows of the shared table corresponding to the enterprise ID. For example, if a specific enterprise is given access to a custom data object, then one or more rows of the shared table may include the columns pertaining to that custom data object's attributes. In some implementations, the rows may be updated in a method similar to blocks 260 and 270 of FIG. 2, with object scripts for the data objects being processed by an application and a virtual table being updated, then bytes being entered into existing columns of the shared table of the non-relational database.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 9A:
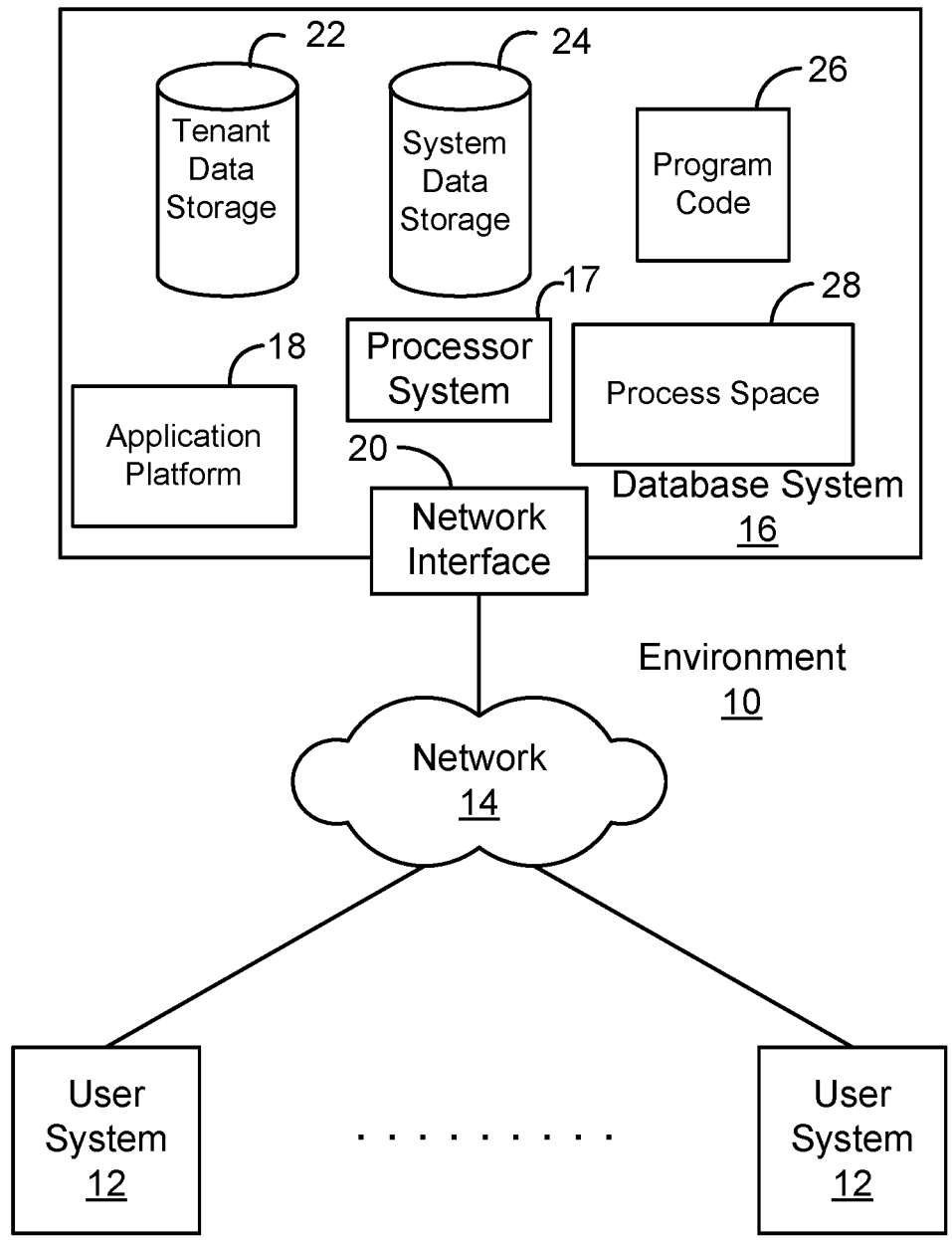
FIG. 9A shows a block diagram of an example of an environment 10 in which an on-demand database service can be used in accordance with some implementations.
Figure 9B:
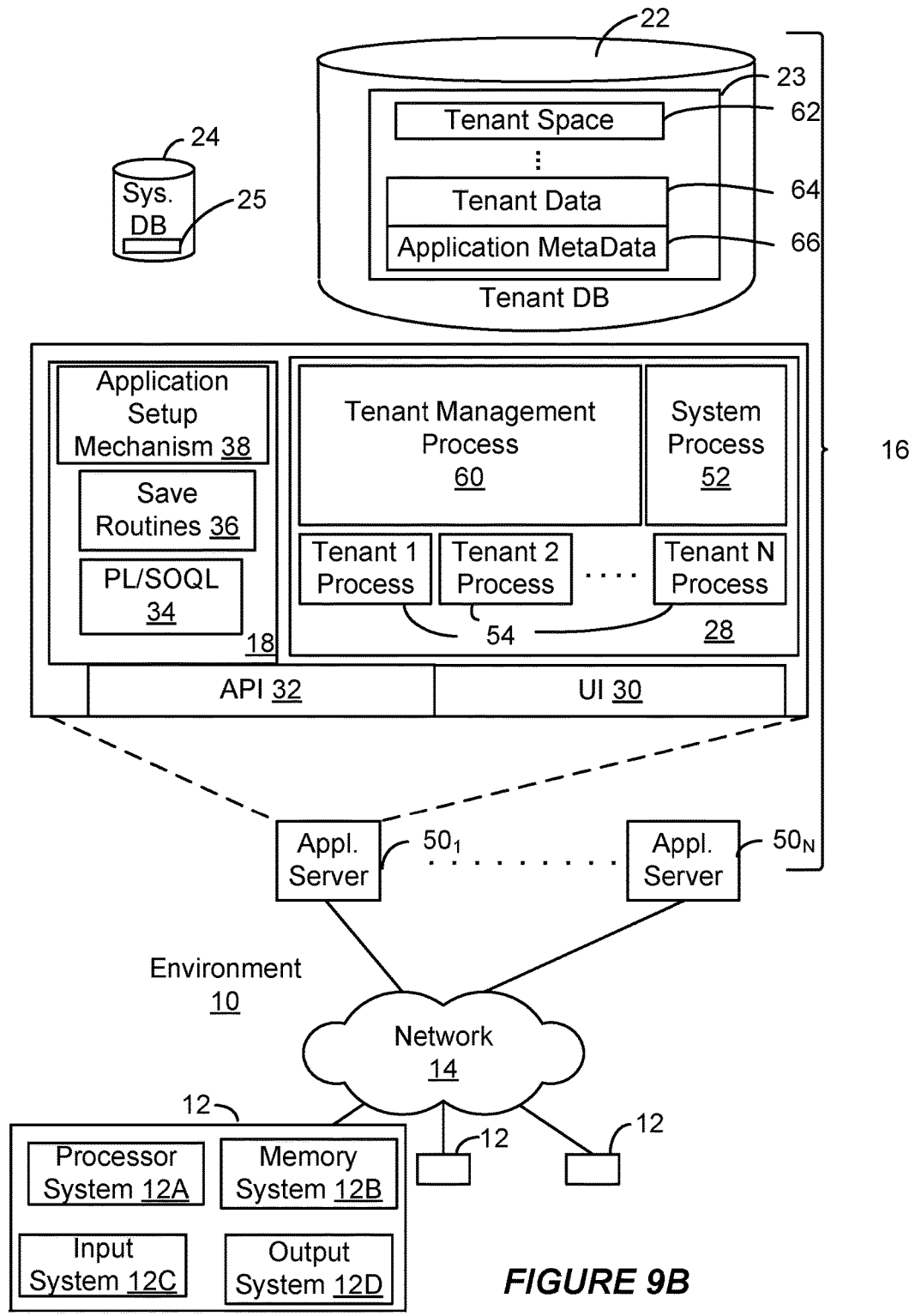
FIG. 9B shows a block diagram of an example of some implementations of elements of FIG. 9A and various possible interconnections between these elements.

FIG. 9A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 9A (and in more detail in FIG. 9B) user systems 12 might interact via a network 14 with an on-demand database service, which is implemented in the example of FIG. 9A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 9A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 9A and 9B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 9A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 9B shows a block diagram of an example of some implementations of elements of FIG. 9A and various possible interconnections between these elements. That is, FIG. 9B also illustrates environment 10. However, in FIG. 9B elements of system 16 and various interconnections in some implementations are further illustrated. FIG. 9B shows that user system 12 may include processor system 12A, memory system 12B, input system 12C, and output system 12D. FIG. 9B shows network 14 and system 16. FIG. 9B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 9A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 9B, system 16 may include a network interface 20 (of FIG. 9A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
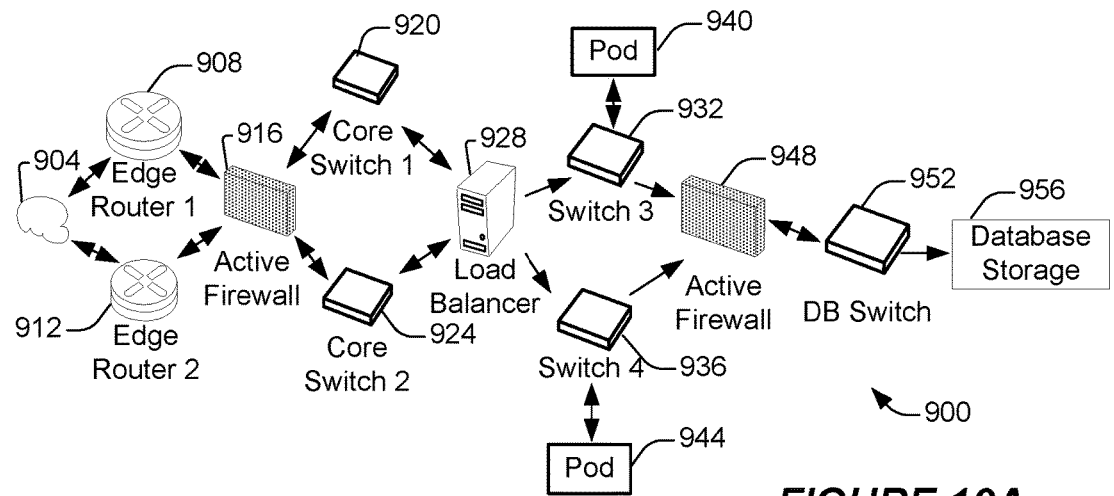
FIG. 10A shows a system diagram of an example of architectural components of an on-demand database service environment 900, in accordance with some implementations.

FIG. 10A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 10B:
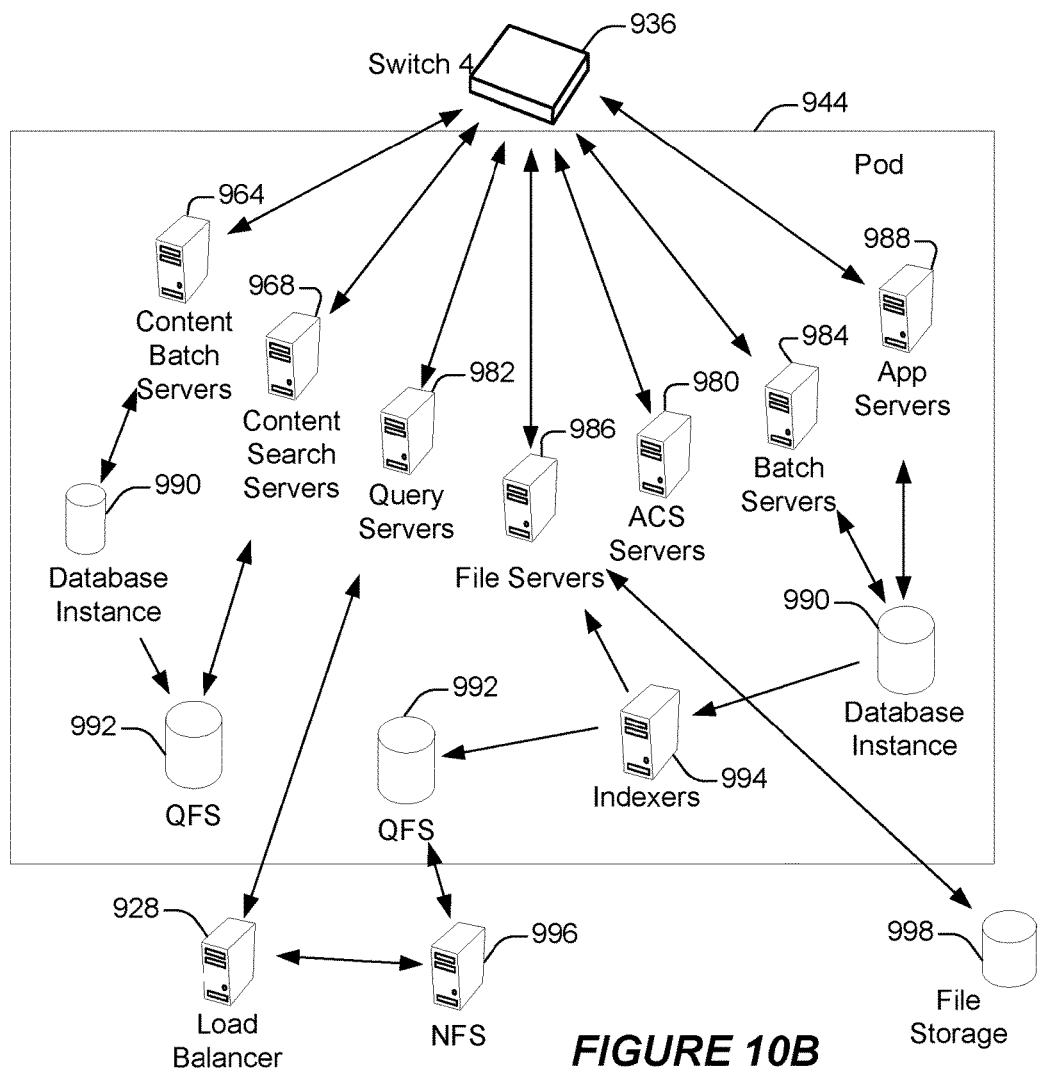
FIG. 10B shows a system diagram further illustrating an example of architectural components of an on-demand database service environment, in accordance with some implementations.

As shown in FIGS. 10A and 10B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 10A and 10B, some implementations of an on-demand database service environment may include anywhere from one to many devices of each type. Also, the on-demand database service environment need not include each device shown in FIGS. 10A and 10B, or may include additional devices not shown in FIGS. 10A and 10B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 10B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 10A and 10B.

FIG. 10B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system comprising:
 a processor; and
 a memory storing instructions configurable to cause the database system to:
  maintain a multi-tenant non-relational database for a plurality of tenant enterprises, the multi-tenant non-relational database storing a plurality of records for the enterprises;
  maintain a dynamic virtual table associated with the records for the enterprises;
  process a request from one of the enterprises to define a custom data object within the database system, the request indicating at least an enterprise ID uniquely identifying the requesting enterprise and identifying one or more attributes of the custom data object;
  generate a custom object script based on the request, the custom object script defining one or more database columns in the database system that correspond to the custom data object, the unique enterprise ID, and the one or more attributes;

update the dynamic virtual table to include one or more virtual columns corresponding to the one or more database columns defined by the custom object script;

update one or more existing columns of a table shared by the enterprises in the multi-tenant non-relational database to match the one or more virtual columns; and restrict access to the one or more existing columns of the shared table for enterprises not associated with the unique enterprise ID.

2. The system of claim 1, wherein the custom object script is associated with the unique enterprise ID.

3. The system of claim 1, wherein the custom data object is an extension of a standard shared object.

4. The system of claim 1, wherein the request from the requesting enterprise identifies one or more primary key columns associated with the custom data object.

5. The system of claim 4, wherein the one or more primary key columns corresponds to the unique enterprise ID.

6. The system of claim 1, the instructions further configurable to cause the database system to:

provision access to the one or more existing columns of the shared table for the requesting enterprise.

7. The system of claim 1, the instructions further configurable to cause the database system to:

add one or more records to the shared table, the one or more records associated with the unique enterprise ID and the one or more existing columns of the shared table.

8. The system of claim 1, the instructions further configurable to cause the database system to:

associate the one or more existing columns of the shared table with one or more privacy settings, the one or more privacy settings determining a visibility of the one or more existing columns.

9. The system of claim 1, wherein the one or more attributes are custom attributes defined by the enterprise.

10. The system of claim 1, wherein the request identifies a correlation ID attribute defined by the enterprise, the correlation ID attribute configurable to aggregate data associated with one or more columns of the shared table.

11. A method comprising:

maintaining a multi-tenant non-relational database for a plurality of tenant enterprises, the multi-tenant non-relational database storing a plurality of records for the enterprises;

maintaining a dynamic virtual table associated with the records for the enterprises;

processing a request from one of the enterprises to define a custom data object within a database system, the request indicating at least an enterprise ID uniquely identifying the requesting enterprise and identifying one or more attributes of the custom data object;

generating a custom object script based on the request, the custom object script defining one or more database columns in the database system that correspond to the custom data object, the unique enterprise ID, and the one or more attributes;

updating the dynamic virtual table to include one or more virtual columns corresponding to the one or more database columns defined by the custom object script;

updating one or more existing columns of a table shared by the enterprises in the multi-tenant non-relational database to match the one or more virtual columns; and restricting access to the one or more existing columns of the shared table for enterprises not associated with the unique enterprise ID.

12. The method of claim 11, wherein the custom object script is associated with the unique enterprise ID.

13. The method of claim 11, wherein the custom data object is an extension of a standard shared object.

14. The method of claim 11, further comprising:

adding one or more records to the shared table, the one or more records associated with the unique enterprise ID and the one or more existing columns of the shared table.

15. The method of claim 11, further comprising:

associating the one or more existing columns of the shared table with one or more privacy settings, the one or more privacy settings determining a visibility of the one or more existing columns.

16. The method of claim 11, wherein the one or more attributes are custom attributes defined by the enterprise.

17. The method of claim 11, wherein the request identifies a correlation ID attribute defined by the enterprise, the correlation ID attribute configurable to aggregate data associated with one or more columns of the shared table.

18. A computer program product comprising computer-readable program code capable of being executed by one or more processors when retrieved from a non-transitory computer-readable medium, the program code comprising instructions configurable to cause:

maintaining a multi-tenant non-relational database for a plurality of tenant enterprises, the multi-tenant non-relational database storing a plurality of records for the enterprises;

maintaining a dynamic virtual table associated with the records for the enterprises;

processing a request from one of the enterprises to define a custom data object within a database system, the request indicating at least an enterprise ID uniquely identifying the requesting enterprise and identifying one or more attributes of the custom data object;

generating a custom object script based on the request, the custom object script defining one or more database columns in the database system that correspond to the custom data object, the unique enterprise ID, and the one or more attributes;

updating the dynamic virtual table to include one or more virtual columns corresponding to the one or more database columns defined by the custom object script;

updating one or more existing columns of a table shared by the enterprises in the multi-tenant non-relational database to match the one or more virtual columns; and restricting access to the one or more existing columns of the shared table for enterprises not associated with the unique enterprise ID.

19. The computer program product of claim 18, wherein the one or more attributes are custom attributes defined by the enterprise.

20. The computer program product of claim 18, wherein the request identifies a correlation ID attribute defined by the enterprise, the correlation ID attribute configurable to aggregate data associated with one or more columns of the shared table.

* * * * *